United States Patent [19]

Grebe

[11] Patent Number: 5,308,975
[45] Date of Patent: May 3, 1994

[54] OPTICAL INSTURMENT HAVING STAGE SUPPORT

[75] Inventor: Volker Grebe, Bochum, Fed. Rep. of Germany

[73] Assignee: Mesacon GmbH, Fed. Rep. of Germany

[21] Appl. No.: 26,186

[22] Filed: Mar. 1, 1993

Related U.S. Application Data

[63] Continuation of Ser. No. 737,466, Jul. 30, 1991, abandoned.

[30] Foreign Application Priority Data

Aug. 3, 1990 [DE] Fed. Rep. of Germany ... 9011381[U]

[51] Int. Cl.⁵ .............................................. H01J 5/02
[52] U.S. Cl. ..................... 250/239; 356/28; 248/901
[58] Field of Search ............... 250/239; 356/28, 28.5; 248/901, 481, 485, 486, 487

[56] References Cited

U.S. PATENT DOCUMENTS

| 4,134,129 | 1/1979 | Filipovich | 358/55 |
|---|---|---|---|
| 4,497,465 | 2/1985 | Yeakley et al. | 248/466 |
| 4,573,794 | 3/1986 | Covey et al. | 356/346 |
| 4,818,101 | 4/1989 | Soreide et al. | 356/28.5 |
| 4,856,172 | 8/1989 | Ahmed et al. | 29/434 |
| 4,919,532 | 4/1990 | Mocker et al. | 356/28.5 |

FOREIGN PATENT DOCUMENTS 2086566A 5/1982 United Kingdom .

OTHER PUBLICATIONS

"Aerospace Mounts for Down-to-Earth Optics", Machine Design, Dec. 12, 1974, pp. 121, 123–127.

Primary Examiner—Jack I. Berman
Assistant Examiner—James Beyer
Attorney, Agent, or Firm—Banner, Birch, McKie & Beckett

[57] ABSTRACT

The invention is directed to an optical instrument comprising a housing and at least one optical assembly enclosed by said housing and mounted on a stage plate. The stage plate is supported on the base plate with the aid of supporting means which guarantees on the one hand a precise fixing of the stage plate compared to the base plate and thus the housing, and on the other hand allows the base plate to distort by whatever attacks without a transfer to the stage plate. There are three supporting structures of different kinds which fix three different points in a special way. Upon the disconnection of the third supporting structure the stage plate can be lifted like a lid around an axis which is the middle axis of the first and second supporting structure.

10 Claims, 3 Drawing Sheets

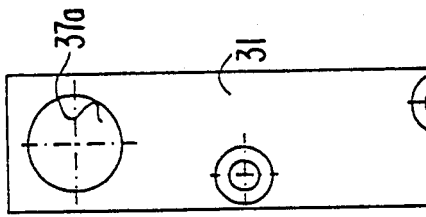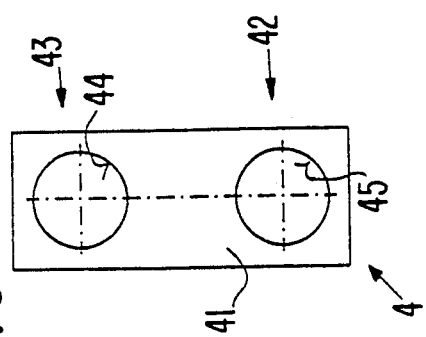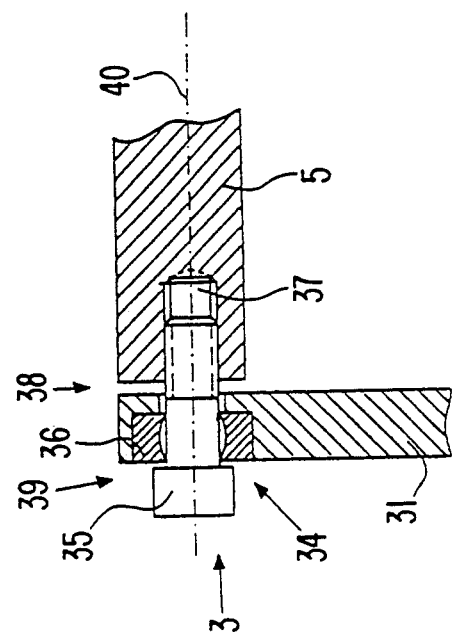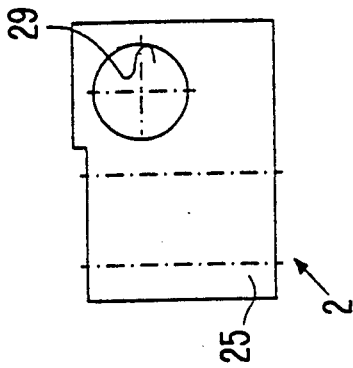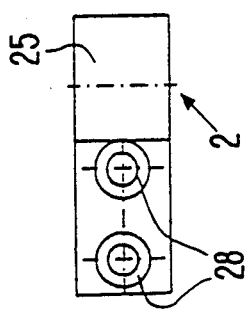

OPTICAL INSTRUMENT HAVING STAGE SUPPORT

This application is a continuation of application Ser. No. 07/737,466, filed Jul. 30, 1991 now abandoned.

BACKGROUND OF THE INVENTION

1. Field of the invention

The present invention is directed to an optical instrument especially for gauging the velocity of a travelling surface of a body or a fluid. The gauging light beam emitted from a laser hits the surface, is reflected and stray reflections are received by a detector, processed by a computer and given as a read out of a velocity. Such an optical instrument or any other optical instrument comprises an optical assembly which is carried by a stage plate. The invention concerns in particular the support of the stage plate carrying an optical assembly.

2. Description of the prior art

One of the fields where optical instruments as initially described are used is the rolling of rails from steel blocks. Since the beginning and the end of a rail in the process of being rolled is detected by the optical instrument and since the velocity of travelling is gauged the length of the rail can be computed within an instant. The optical instrument cannot be placed too far away from the rolling action, and therefore measurements have to be taken to maintain the accuracy of the optical instrument by excluding too much thermal stresses.

One known optical instrument for the contactless gauging of the velocity and the length of an object with the aid of a laser beam has a robust cast aluminium housing which has to be cooled by water. The housing consists of a thick-walled base and lateral as well as frontal plates in which the cooling water of the cooling system can circulate. Despite these efforts heat creeps into the structure, because not all areas of the housing can be reached by the cooling system so that distortions may occur. These distortions compromise the optical assembly for the focussing and guiding of the laser beam.

There are gauging systems with two beams or one beam and in the latter case there is a reference beam. In any case, the gauging light beam which is split, reflected and focussed and the stray reflections have to be passed through several optical components like lenses, mirrors and other optical aids which have to be positioned extremely accurate one to the other. If an accurate positioning is distorted by a mechanical attack or by heat deformation the quality of the instrument suffers severely. The velocity is measured by gauging the frequency of a surge received from overlapping the original frequency and the frequency of the stray reflections modified by the Doppler-effect.

OBJECTS OF THE INVENTION

It is one object of the invention to improve the accuracy of an optical instrument which is necessarily subjected to heat radiation.

It is a further object of the invention to reduce or even to exclude the necessity of a water cooling in a difficult, heat soaked environment.

It is a further object of the invention to reduce the costs of the assembly of an optical instrument which must be protected against distortion caused by heat.

SUMMARY OF THE INVENTION

The present invention is directed to an optical instrument especially for gauging the velocity of a travelling surface with the aid of a gauging light beam emitted by a laser and a detector receiving stray reflections of said light beam after a reflection on said surface. The instrument comprises a housing having a base plate and at least one optical assembly enclosed by said housing and mounted on a stage plate, said stage plate being supported on said base plate by supporting means. The supporting means supports the stage plate in such a way that any distortion of the base plate is not transferred to the stage plate, neither a bending nor a torsion distortion.

For achieving this goal the supporting means fixes one first point of said stage plate as to an axial movement to and from said base plate and within its own plain, one second point as to an axial movement to and from said base plate and within its own plain beside an axial movement along an axis through both of said first and second points, and one third point as to an axial movement to and from said base plate.

The fixing of the first point is preferably carried out by a ball joint which allows no axial displacement but only rotational displacement. The second point is fixed in such a way that an axial movement to and for the first point is possible and all rotational movements with the aid of a further ball joint. The third point is just fixed as to the distance between the base plate and the stage plate, for instance with the aid of a link member having two ball joints attached to the base plate and the stag plate respectively.

With such a support of the stage plate there is no possibility of the base plate to transfer its own distortion onto the stage plate. No torque can be transmitted by the support means and no longitudinal change is carried over to the stage plate so that there is a perfect and faultless uncoupling of the stage plate from the base plate. Accordingly, the optical assembly carried by the stage plate suffers only as long as the stage plate itself suffers any distortion. But these distortions can be kept to a minimum by a conventional heat isolation of the whole unit.

BRIEF DESCRIPTION OF THE DRAWINGS

FIG. 5 is the view of a support structure used for supporting a stage plate in an optical instrument according to the invention.

FIGS. 6, 7, 8 and 9 are several views of three support structures in total.

DETAILED DESCRIPTION OF THE PREFERRED EMBODIMENTS

Figure 1:
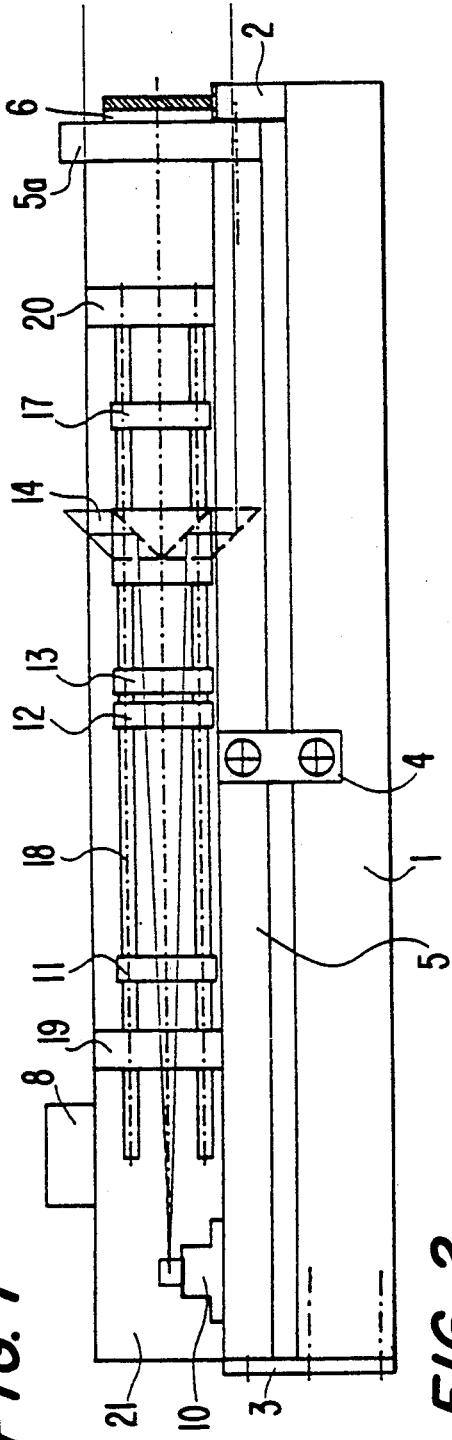
FIG. 1 is a lateral view of an optical instrument for gauging the velocity of a travelling surface with the aid of a laser emitting a gauging light beam.

The optical instrument shown in FIGS. 1, 2, 3 and 4 comprises substantially a base plate 1 as part of a housing (not shown) and a stage plate 5 which is carried by three supporting structures 2, 3, and 4. The stage plate 5 is supported parallel to the base plate 1 and in a distance to this base plate 1. The stage plate 5 carries a laser unit 6 and an optical assembly.

The optical assembly comprises, in the direction of the laser beam 7 leaving the laser unit 6, a Bragg-cell 8, two prisms 9, 10, one dispersion lens 11, one collecting lens 12, a cylinder lens 13, a main emitting prism 14, a receiving lens 15, an interference filter 16 and a photo diode 17. The elements 11, 12, 13, 14 and 17 are arranged in a usual four-bar-arrangement 18 which in turn is supported by two vertical plates 19, 20. The plates 19, 20 are mounted to a longitudinal plate 21 fixed to the stage plate 5 and to the stage plate 5 itself.

The gauging method is not object of the invention. Therefore, the function of the optical assembly is only described superficially. The beam 7 emitted by the laser unit 6 is seperated or split into two partbeams by the optical assembly which leave the main emitting prism 14 as two gauging beams 22, 23 under different angles and fall onto a not shown surface of an object. The stray reflections coming back from the surface, frequency modified by the Doppler-effect due to the velocity of the object, are received by the receiving lens 15 and directed to the photodiode 17. The surge of the overlapped original frequency and modified frequency is computed by an electronic circuitry which is not shown. Finally, there is given at least a velocity or a velocity and/or a length. From this description it is clear that the precision of the instrument depends substantially on the maintaining of the adjustment of the participating optical components one against the other.

Figure 3:
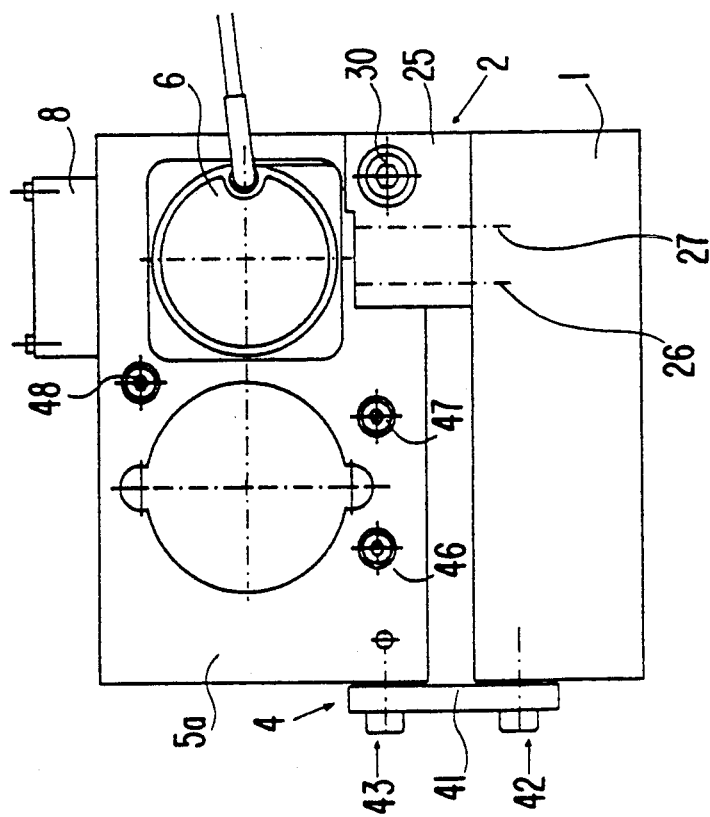

There is a first supporting structure 2 which consists mainly of a block 25 as may be taken from FIGS. 3, 6 and 7. The block 25 is screwed to the base plate 1 as indicated by dotted lines 26 and 27 in FIG. 3 and by corresponding recessed holes 28 in FIG. 7. The block 25 is placed close to one corner of one of the two smaller frontal sides where it joins the lateral longer side. The block 25 carries a bore 29 in which a ball joint is placed. The ball joint is similar to that shown in FIG. 5. In a housing with a spherical inner face a drilled ball is received without play but readily moveable. A bolt 30 passes through the hole within the ball and is screwed into a frontal plate 5a (FIG. 1) which is fixed to the stage plate 5 with the aid of screws 46 and 47 and to the longitudinal plate 21 with the aid of a screw 48. The connection between the stage plate 5, the block 25 and the bolt 30 is of that kind that the stage plate 5 is fixed as to the block 25 in the plain of the stage plate 5, however, the ball joint allows, to a certain amount, turning movements of the stage plate 5 compared to the block 25.

Figure 4:
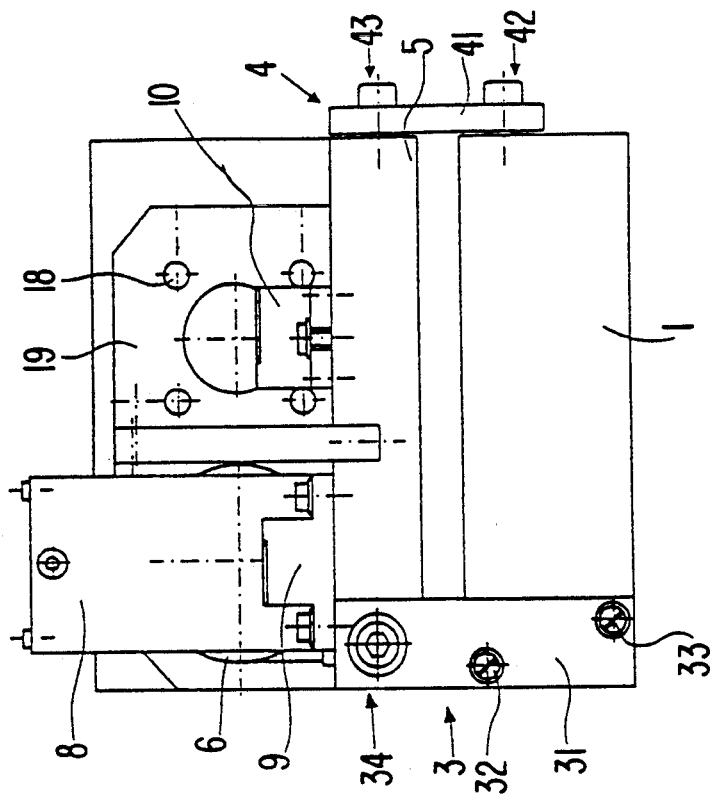

The second supporting structure 3 is especially visible in FIG. 4 in connection with FIG. 8. It comprises a block 31 which is screwed to the (other) frontal side of the base plate 1 with the aid of screws 32 and 33. The block 31 carries a bore 37a which is in line with the bore 29 of the block 25 which is part of the first supporting structure 2. The bore 37a carries a ball joint 36 which in turn encircles a drilled ball. The ball of the ball joint 36 is passed by a bolt 35 which is screwed into a threaded hole 37 within the stage plate 5 (FIG. 5). Contrary to the bolt 30 (FIG. 3) which passes a corresponding ball joint, the bolt 35 is displaceable within the ball of the ball joint 36 along its middle axis 40 which is shown in FIG. 5. The arrows 38 and 39 indicate room on both sides of the block 31 in order to allow a sliding movement along the axis 40 and all turning movements due to the effect of the ball joint 36. The middle axis 40 of the bolt 35 is also th middle axis of the bore 29 and the bolt 30 in the block 25. Thus the second supporting structure is a combination of a ball joint and an axial guide and both functions are covered by the arrow 34 in FIG. 5.

If the base plate 1 becomes longer due to a heat soak the sliding effect between the bolt 35 and the bore of the ball of the ball joint 36 compensates this growth in length without carrying the stage plate 5 with it. If the base plate 1 is bent by heat or mechanical abuse both ball joints in the block 25 and the block 31 respectively will allow an angular movement of the two blocks without transferring this movement to the stage plate 5. Of course, all these movements are very small in the region of less than a millimeter and less than an angle of a few minutes.

The third supporting structure 4 is best shown in FIGS. 1, 3 and 9. It consists mainly of a link member 41 which carries two ball joints 42 and 43 at the level of the base plate 1 and the stage plate 5 respectively. The ball joints 42 and 43 are not shown in detail, but from FIGS. 3 and 4 a certain distance of the link member 41 from both plates 1 and 5 is clearly visible. Again, the balls of the ball joints 42 and 43 are passed by bolts which are shown in FIGS. 3 and 4. The ball joints 42 and 43 are received within bores 44 and 45 within the link member 41.

The stage plate 5 hovers above the base plate 1 supported by the described supporting means 2, 3 and 4 and in this way the uncoupling of the optical system carried by the stage plate 5 is carried out away from the base plate 1 which might suffer from distortions by mechanical or thermal attacks. In this way the optical assembly keeps its adjustment much better than in known units so that in total the accuracy of the whole instrument is very much improved.

The base plate 1 carries electric and electronic circuits, a measurement, which contributes to the compactness of the whole unit. By disconnecting the link member 41, for instance by undoing one of the screws shown in FIG. 3 or 4, the stage plate 5 can be tilted upwards like a lid, thus giving assess to the electric and electronic circuitry. The turning axis is the middle axis 40 which passes through the two ball joints within the blocks 25 and 31. If the assess to the electronic circuitry is no longer needed the link member 41 is re-connected again and the instrument is again ready for being used.

Figure 2:
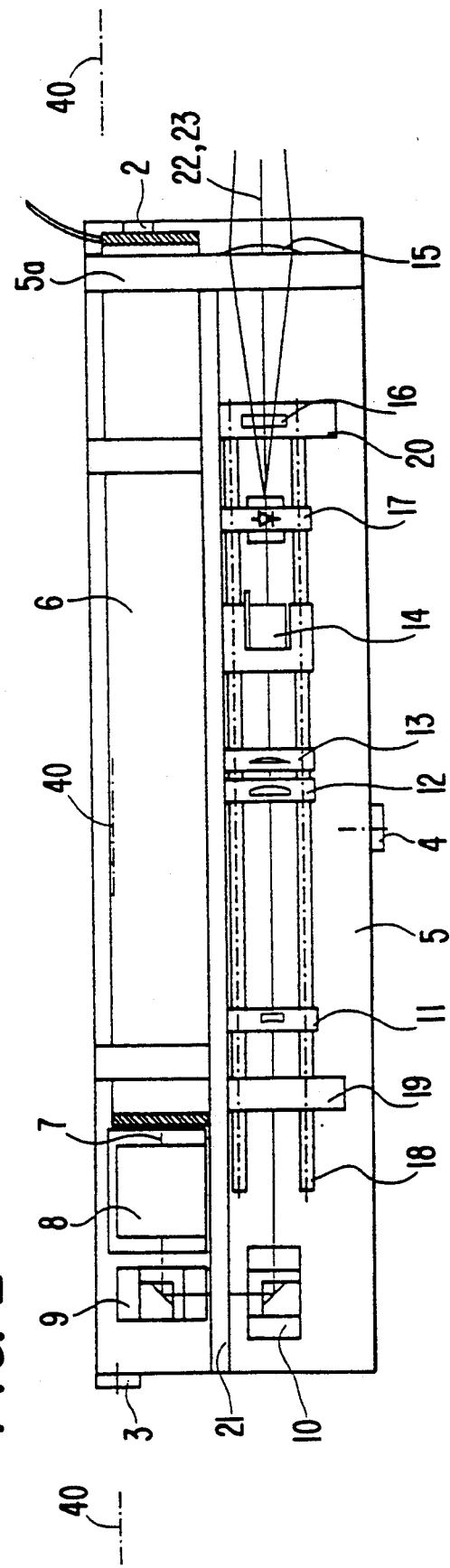
FIG. 2 is a top view, FIG. 3 a front view, and FIG. 4 a back view of the instrument shown in FIG. 1.

Especially in FIG. 2 the triangular configuration of the three points of fixing can be seen. While the first and second supporting structures 2 and 3 are positioned on a line adjacent one length side of the stage plate 5 the third support structure 4 is positioned on the opposite length side approximately in the centre thereof. Of course, the third supporting structure 4 can be arranged at any place along this length side as long as there is kept a triangular configuration of the three supporting structures 2, 3 and 4.

What is claimed is:

1. An optical instrument for gauging the velocity of a travelling surface with the aid of a gauging light beam emitted by a laser and a detector receiving stray reflections of said light beam water a reflection on said surface, comprising a housing having a base plate,
at least one optical assembly enclosed by said housing and mounted on a stage plate, said stage plate being supported on said base plate by supporting means which fixes (1) said stage plate at one first point inhibiting translation movement and allowing at least some rotational movement of said stage plate at said one point, (2) said stage plate at one second point inhibiting transactional movement except for movement along an axis through both of said first and second points and allowing rotational movement of said stage late at said second point, and (3) said stage plate at one third point inhibiting transactional movement and allowing rotational movement of said stage plate at said third point, thus preventing thermal, torsional or bending deformation of said stage plate irrespectively of a mechanical or thermal attack onto said housing.

2. An optical instrument according to claim 1, wherein said stage plate is spaced from and parallel to said base plate.

3. An optical instrument according to claim 1, wherein said supporting means comprises a first, second and third supporting structure, each supporting structure including at least one ball joint.

4. An optical instrument according of claim 3, in which the stage plate has a rectangular shape, said first and second supporting structure for fixing said first and said second point respectively being arranged on opposite side of said stage plate and said third supporting structure for fixing said third point being arranged on the side linking said opposite sides.

5. An optical instrument according to claim 4, wherein the third supporting structure is positioned essentially in the center of said linking side.

6. An optical instrument according to claim 4 or 5, wherein said first and second supporting structure are placed close to the corner on each side away from said linking side.

7. An optical instrument according to claim 3, in which each of said first and second supporting structure includes a block attached to the base plate and a ball joint positioned within said block, said ball joint of said first supporting structure receiving axially fixed a bolt screwed into said stage plate and said ball joint of said second supporting structure receiving axially displaceable a bolt screwed into said stage plate.

8. An optical instrument according to claim 3, wherein the third supporting structure comprises a link member, the link member being attached to the base plate and the stage plate respectively by a ball joint.

9. An optical instrument according to claim 1, wherein the base plate is of rectangular shape.

10. An optical instrument according of claim 1, wherein said supporting means provides for rotational movement of said stage plate about each of said first, second, and third points.

* * * * *